United States Patent
Wuest et al.

(10) Patent No.: US 12,412,141 B2
(45) Date of Patent: Sep. 9, 2025

(54) SYSTEMS AND METHODS OF USING BUSINESS IMPACT ANALYSIS DATA TO ASSESS THE RISK OF SECURITY MITIGATION STEPS

(71) Applicant: Acronis International GmbH, Schaffhausen (CH)

(72) Inventors: Candid Wuest, Bassersdorf (CH); Philipp Gysel, Bern (CH); Irina Lukasheva, Milan (IT); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 182 days.

(21) Appl. No.: 18/344,317

(22) Filed: Jun. 29, 2023

(65) Prior Publication Data

US 2025/0005489 A1    Jan. 2, 2025

(51) Int. Cl.
| | |
|---|---|
| G06Q 10/0635 | (2023.01) |
| G06F 21/55 | (2013.01) |
| G06F 21/56 | (2013.01) |
| G06F 21/57 | (2013.01) |

(52) U.S. Cl.
CPC ....... *G06Q 10/0635* (2013.01); *G06F 21/554* (2013.01); *G06F 21/566* (2013.01); *G06F 2221/034* (2013.01)

(58) Field of Classification Search
CPC . G06Q 10/0635; G06F 21/544; G06F 21/566; G06F 21/577
See application file for complete search history.

(56) References Cited

U.S. PATENT DOCUMENTS

| | | | | |
|---|---|---|---|---|
| 10,657,469 | B2 * | 5/2020 | Bade | G06Q 10/063 |
| 10,938,839 | B2 * | 3/2021 | Humphries | H04L 63/1408 |
| 10,999,301 | B2 * | 5/2021 | Mendes | G06Q 30/018 |
| 11,050,773 | B2 * | 6/2021 | Will | H04L 63/145 |
| 11,323,471 | B2 | 5/2022 | Crabtree et al. | |
| 11,379,773 | B2 | 7/2022 | Vescio | |
| 12,107,869 | B1 * | 10/2024 | Kannan | H04L 63/20 |
| 2016/0373480 | A1 * | 12/2016 | Sridhar | H04L 63/1441 |
| 2017/0220964 | A1 * | 8/2017 | Datta Ray | H04L 63/1433 |
| 2018/0020021 | A1 * | 1/2018 | Gilmore | H04L 63/1441 |
| 2020/0220885 | A1 * | 7/2020 | Will | H04L 63/145 |
| 2021/0211452 | A1 * | 7/2021 | Patel | H04L 63/1416 |
| 2021/0297427 | A1 * | 9/2021 | Narula | G06F 3/048 |
| 2023/0005360 | A1 * | 1/2023 | Zhou | G06N 20/20 |
| 2023/0009127 | A1 * | 1/2023 | Boyer | H04L 63/1441 |
| 2023/0412620 | A1 * | 12/2023 | Crabtree | H04L 63/1416 |
| 2024/0121242 | A1 * | 4/2024 | Miyake | H04L 63/102 |
| 2025/0039223 | A1 * | 1/2025 | Thompson | H04L 63/1425 |

* cited by examiner

*Primary Examiner* — Dylan C White
(74) *Attorney, Agent, or Firm* — ESPE Legal Consultancy FZ-LLC (57) ABSTRACT

Systems and methods for the protection of information systems utilize business impact analysis (BIA) data to assess the risk of security mitigation operations. A detected security incident is enriched using BIA data. A proposed mitigation action and a risk of implementing the proposed mitigation action are determined using the enriched data so that an administrator user can understand the impact or risk to the business for the proposed mitigation action.

20 Claims, 5 Drawing Sheets

SYSTEMS AND METHODS OF USING BUSINESS IMPACT ANALYSIS DATA TO ASSESS THE RISK OF SECURITY MITIGATION STEPS

TECHNICAL FIELD

Embodiments relate generally to information systems security. More particularly, embodiments relate to integration of business impact analysis (BIA) in information systems security.

BACKGROUND

Information systems security is the protection of information systems against unauthorized access to or modification of information, whether in storage, processing or transit, and against the denial of service to authorized users, including those measures necessary to detect, document, and counter such threats.

Endpoint detection and response (EDR) and extended detection and response (XDR), provide various options for incident response and threat mitigation and remediation. For instance, potentially compromised endpoints can be automatically isolated within the network, suspicious processes can be terminated and added to a block lists, and files can be rolled back. These actions may be taken manually, requiring the user to understand the full attack and its consequences, or through automation, such as artificial intelligence/machine learning (AI/ML)-based response plans.

However, automated actions can sometimes cause unintended side effects that may be even more disruptive than the initial attack. For example, isolating an email server from the internet upon detecting a crypto-mining Trojan would prevent an organization from sending and receiving emails. In many cases, the impact of the crypto-mining Trojan is less harmful than shutting down an email server for several hours. Similarly, terminating a database server's process or partially restoring files on the server could result in an unstable and corrupted database, necessitating more time and effort to repair.

In traditional systems, an administrator is not provided with an impact or risk of a given mitigation action. Further, risk mitigations are not differentiated between high and low risk actions, and do not allow an administrator to only perform low risk actions automatically. As each organization has different requirements and core processes, no one-size-fits-all system or method can be applied. Accordingly, there is a need for improved business impact analysis that is connected to security mitigation actions for information systems security.

SUMMARY

Embodiments described or otherwise contemplated herein substantially meet the aforementioned needs of the industry. Embodiments described herein utilize business impact analysis data to assess the risk of security mitigation operations in information systems security.

In a feature and advantage of embodiments, an administrator of information systems security can better understand the impact or risk to his business for a proposed mitigation action. Understanding a potential impact or risk thereby minimizes unwanted side effects that could lead to business disruptions. Dynamic integration of information systems security and business impact into a single system allows for risks to be understood easier and faster. This allows the administrator to assess the impact of a cyber-attack and the impact of a mitigation action.

In a feature and advantage of embodiments, security incidents can be enriched with business impact analysis data. In one example, a security incident can be evaluated or re-evaluated based on integrated BIA data. Accordingly, the security incident itself can be upgraded or downgraded.

In another feature and advantage of embodiments, BIA data can be utilized in a security solution to automatically grade and rate incident and mitigation response actions. In this way, BIA data can be bound to threat mitigation or remediation actions. In embodiments, incident and mitigation response actions can be evaluated not only by their impact to neutralizing the threat, but also with a respective impact to the business.

In another feature and advantage of embodiments, time-based decision logic can re-assess security incidents and any response action to a security incident after dynamic and configurable time intervals. Accordingly, embodiments are dynamically adapted to the implementation system.

In an embodiment, a method for protecting a system under threat comprises gathering business impact analysis (BIA) data related to the system under threat; gathering, using one or more sensors operably coupled to the system under threat, security input data for the system under threat; detecting a security incident based on the security input data; enriching the security incident with BIA data to generate an enriched data structure, the enriched data structure including: BIA data bound to a plurality of mitigation actions, and BIA data bound to at least one device of the system under threat affected by the security incident; presenting, using a graphical user interface, at least one of the plurality of mitigation actions to mitigate the security incident and a risk of implementing the at least one of the plurality of mitigation actions based on the enriched data structure; mitigating the security incident based on the at least one of the plurality of mitigation actions; and re-evaluating if the security incident has been fully mitigated.

In one aspect, enriching the security incident with BIA data includes determining overlapping data using at least one of: a server identifier, a system identifier, a process name, an application name, a file name, a network equipment identifier, and a network connection identifier.

In one aspect, a method includes determining an original level of urgency of the security incident based on the security input data; and changing the original level of urgency to an updated level of urgency of the security incident based on enriching the security incident with BIA data.

In one aspect, the updated level of urgency is determined according to: proportional to a severity value of the security incident; inversely proportional to a business impact value; and proportional to an elapsed time value of the security incident.

In one aspect, the at least one of the plurality of mitigation actions to mitigate the security incident is different for the changed level of urgency than the original level of urgency.

In one aspect, presenting the at least one of the plurality of mitigation actions further comprises using a generative AI model to describe the security incident and the impact of the at least one of the plurality of mitigation actions using the graphical user interface.

In one aspect, re-evaluating if the security incident has been fully remediated includes comparing a delay counter against a time delay interval.

In one aspect, the time delay interval is dynamically adjusted using a machine learning model.

In one aspect, a method further includes receiving configuration settings including a risk level tolerance for a mitigation action and a risk level tolerance for a severity level of the security incident, wherein the at least one of the plurality of mitigation actions is presented based on the configuration settings.

In an embodiment, a system for protecting a system under threat comprises computing hardware of at least one processor and memory operably coupled to the at least one processor; and instructions that, when executed on the computing hardware, cause the computing hardware to implement: a business impact engine configured to gather business impact analysis (BIA) data related to the system under threat, a security solution engine configured to: detect a security incident based on security input data for the system under threat, the security input data including data from one or more sensors operably coupled to the system under threat, and mitigate the security incident based on at least one of the plurality of mitigation actions, an enrichment engine configured to enrich the security incident with BIA data to generate an enriched data structure, the enriched data structure including: BIA data bound to a plurality of mitigation actions, and BIA data bound to at least one device of the system under threat affected by the security incident, a presentation engine configured to present, using a graphical user interface, at least one of the plurality of mitigation actions to mitigate the security incident and a risk of implementing the at least one of the plurality of mitigation actions based on the enriched data structure, and a re-assessment engine configured to re-evaluate if the security incident has been fully mitigated.

In an embodiment, a method for protecting a system under threat comprises gathering business impact analysis (BIA) data related to the system under threat; gathering, using one or more sensors operably coupled to the system under threat, security input data for the system under threat; detecting a security incident based on the security input data enriched with the BIA data; determining an urgency related to the security incident; performing a first mitigation action for the security incident; determining whether the security incident is resolved; when the security incident is not resolved, calculating a wait time; waiting according to the wait time; determining human intervention for the system under threat associated with the security incident; when human intervention is not determined, determining a second urgency related to the security incident; and when human intervention is determined, performing a second mitigation action for the security incident.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 1:
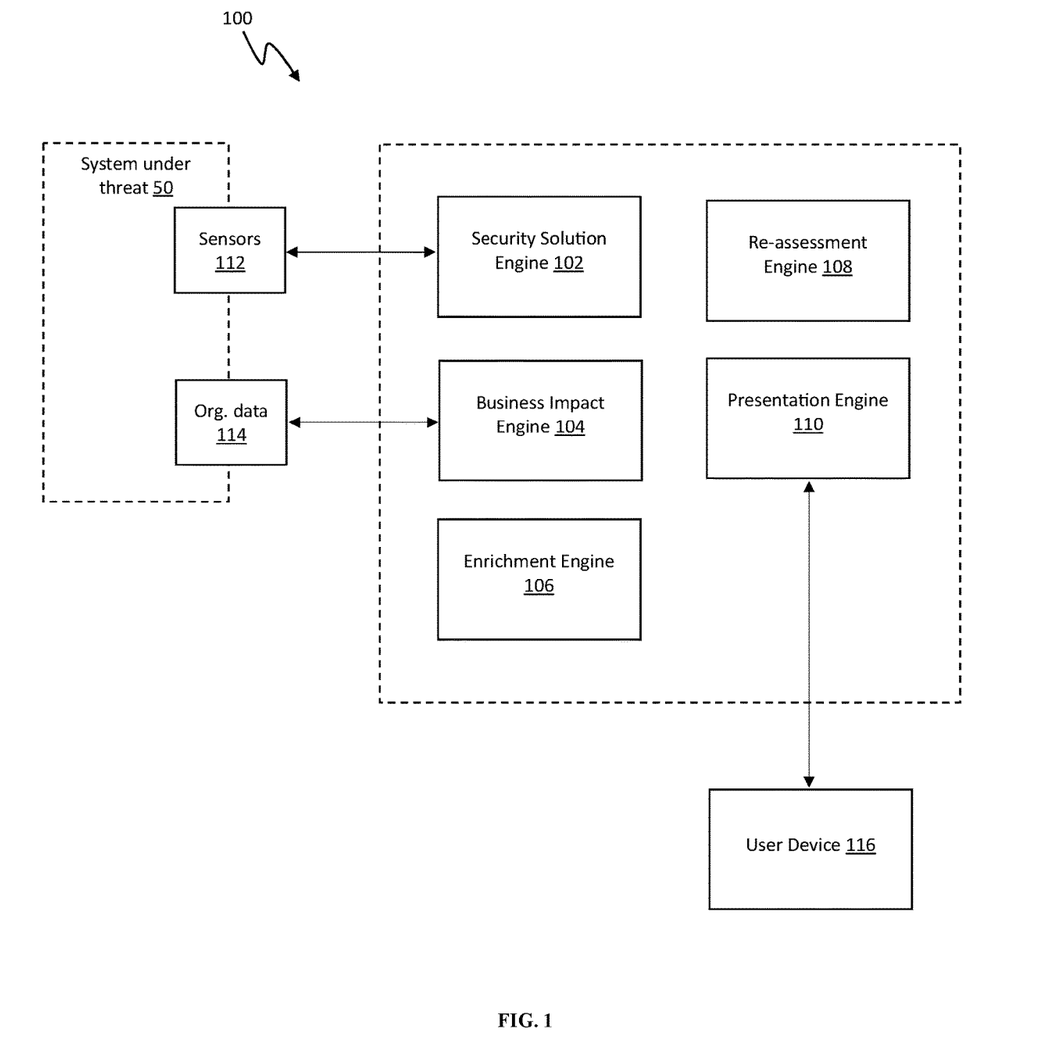
FIG. 1 is a block diagram of a system enriched with business impact analysis data for protecting a system under threat, according to an embodiment.

Embodiments described herein integrate business impact analysis data into information systems security solutions. Referring to FIG. 1, a block diagram of a system 100 enriched with business impact analysis data is depicted, according to an embodiment. As illustrated, system 100 is configured to protect a system under threat 50, which can include a plurality of endpoints, a plurality of user devices, and one or more communications networks (not depicted in FIG. 1 for ease of illustration). For instance, system under threat 50 can include a combination of software, hardware, and telecommunication networks such as an information system for a corporation or organization.

System 100 includes various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

System 100 generally comprises a security solution engine 102, a business impact engine 104, an enrichment engine 106, a re-assessment engine 108, and a presentation engine 110.

Security solution engine 102 is configured to detect and mitigate cyber threats on system under threat 50. In an embodiment, security solution engine implements real-time continuous monitoring and collection of system under threat 50 data with automated response and analysis capabilities in coordination with the other components of system 100, as described herein.

In example embodiments, security solution engine 102 can comprise detection and mitigation capabilities including endpoint detection and response (EDR), endpoint threat detection and response (ETDR), and/or extended detection and response (XDR) across multiple endpoints and the platform of system under threat 50.

In an embodiment, security solution engine 102 can utilize one or more sensors 112 that are operably coupled to system under threat 50. Sensors 112 can include data collectors such as endpoint monitoring devices configured to collect data related to processes, connections, volume of activity, and data transfers. Sensors 112 can further include network-based data collectors. Accordingly, security solution engine 102 can output security data related to threats of system under threat 50, such as a security incident, urgency of the security incident, one or more mitigation actions, certain automation related to security of system under threat 50, and other similar security information.

Business impact engine 104 is configured to generate business impact analysis data. In an embodiment, business impact engine 104 can utilize organizational data 114 that is derived from system under threat 50 (e.g. the system of the business).

Business impact analysis engine 104 can implement, for example, specific business impact analysis tools that rate the importance of servers by their applications, advanced tools that analyze the infrastructure using artificial intelligence or machine learning (AI/ML) models, utilize consulting reports analyzing the business, or utilize internal surveys and exercises that define system under threat 50 importance by questioning different business units.

In embodiments, business impact analysis data can be static or dynamically updated over time. For example, during Black Friday, the online store of a reseller has a very high priority and importance. Business impact engine 104 therefore defines the impact to the business if a certain server is lost or unavailable and the risk of this happening. Business impact analysis data provides various granularity of business impact and importance of various servers, applications, and network connections. Each entity in the infrastructure can be defined by at least a low/medium/high rating, describing the impact for the business if the entity is not available.

Enrichment engine 106 is configured to bind business impact analysis data to output of security solution engine 102 (e.g. enrich security data). In one example, enrichment engine 106 can bind impact analysis data to a security incident. In this way, the security incident can be evaluated from a business perspective in view of the security perspective, compared to solely a security perspective, as in existing solutions. In another example, enrichment engine 106 can bind impact analysis data to mitigation actions for the security incident. In this way, any potential mitigation actions for the security incident can be evaluated from a business perspective in view of the security perspective, compared to solely a security perspective, as in existing solutions.

In an embodiment, enrichment engine 106 can accordingly generate an enriched data structure. For example, an enriched data structure can include a graph data structure. In one example, a graph data structure can include an extended planar graph that uses nodes, edges, and faces to represent the topological relations of map features as a first graph. Accordingly, the space is subdivided completely by the nodes and edges of the map features. The use of such a topology graph in an algorithm ensures data integrity of overlapping BIA data and security data (and other data, as enriched). Once enriched, a second (enriched) graph can further incorporate BIA data in additional nodes, edges, and faces added to the first graph.

In another example, an enriched data structure can include a flat table. Enrichment engine 106 can generate a flat table and add data to the flat table with a link to each resource (e.g. server A) to the corresponding BIA data. In an embodiment, the flat table can reflect a prioritized list.

In an embodiment, enrichment engine 106 is therefore operably coupled to security solution engine 102 and business impact engine 104. In an embodiment, enrichment engine 106 receives security data as input, receives business impact data as input, and binds the business impact data to the security data.

In an embodiment, enrichment engine 106 security data can be communicated to enrichment engine 106 from security solution engine 102. In another embodiment, data from security solution engine 102 can be stored in a central location, such as a security console or dashboard, or backend database accessible by enrichment engine 106.

Enrichment engine 106 can use overlapping common keys to identify data for enrichment. In an embodiment, keys for overlapping data can include server IDs, system IDs, process and application names, file names, network equipment and network connection IDs, and so on. Common keys can be identified by full integration into security solution engine 102 into system 100 such as an XDR product or as an integration plugin using API calls.

Bound BIA-security data can further be utilized by enrichment engine 106 or be integrated into security solution engine 102 for enhanced security determinations, as described herein. Accordingly, the functionality of enrichment engine 106 can be implemented in security solution engine 102.

In one example, security solution engine 102 can detect a potential threat based on its detection logic. Enrichment engine 106 (or security solution engine 102, or in combination with enrichment engine 106, in embodiments) takes the current business impact analysis data into account using and maps the current business impact analysis to the affected entity. For example, an affected entity could be a server where the infection occurred or one or more processes that were affected. Combining this with the severity and type of the detected threat may result in a change of urgency of the incident, as calculated by security solution engine 102. For example, if a medium-severe threat like a Trojan horse has been found on a high critical server related to the organization, then this incident should have a higher priority (e.g. urgency) compared to when the same threat is found on a test workstation in a lab, which is less critical to the organization.

Re-assessment engine 108 is configured to evaluate any mitigation actions implemented by security solution engine 102. For example, re-assessment engine 108 can determine whether a mitigation action successfully mitigated the security incident. Re-assessment engine 108 is configured to determine degrees of success, such as the action partially, but not fully, remediating the security incident.

In an embodiment, re-assessment engine 108 is configured with a timing component such that a re-assessment can be made in view of one or more time-based values. For example, system 100 can be configured with a time-based value (time1) which can be set proactively, to configured re-assessment engine 108 to re-assess the mitigation action after a given time period. This time period can either be a fixed length, incremental increasing or decreasing length or dynamically triggered based on external factors such as number of alerts or warnings from AI/ML models.

An administrator can configure system 100 according to a time value using the timing component of re-assessment engine 108. In one example, incidents that are classified as critical by security solution engine 102, and have a mitigation action classified as medium, do not start mitigating automatically, but rather enter a wait period. After the wait period (e.g. 30 minutes) if no actions have been taken by the administrator, the actions will be conducted automatically. This allows the administrator to be in control and make his own decisions but helps in situations where the administrator is not aware of the alert, e.g. while asleep, and where a mild action at that time is better than having to wait any longer. Timing settings can allow application of medium risk mitigation actions first, e.g. isolating the machine, before more risky steps are automatically taken such as terminating applications and restoring data. (e.g. one hour later).

In an embodiment, the risk level and severity can be automatically reevaluated after the time1 interval has expired. The incident might now be upgraded to a higher urgency as the time has passed, which can then trigger other automated reactions.

Presentation engine 110 is configured to present bound BIA-security data to an administrator user, such as via user device 116. Accordingly, presentation engine 110 is operably coupled to user device 116. For example, user device 116 can include a desktop computer, a laptop computer, tablet, or mobile computing device.

For example, security solution engine 102, having integrated bound BIA-security data, can present a security incident in view of the business risk to system under threat 50. In an embodiment, presentation engine 110 is further configured to present a mitigation action related to the security incident according to the bound BIA-security data. In an embodiment, presentation engine 110 can further present risk levels associated with the mitigation action.

In an embodiment, mitigation/remediation actions offered or proposed by security solution engine 102 in view of the linked business impact analysis data are presented by presentation engine 110. For example, risk and business impact ratings can be presented to the user in a dashboard or near the selection of each mitigation actions. The risk rating can be simplified in a low, medium, and high color rating or in a more granular grading. The mitigation actions can either be manually selected by the user, pre-selected by the solution, or be set automatically through heuristics or AI/ML learning from previous incidents and/or data from external systems. Security solution engine 102 can add extra warnings to present through presentation engine 110 if the user selects actions with a high impact to system under threat 50.

In an embodiment, presentation engine 110 can further utilize a generative AI model. For example, a generative AI model can be implemented using a neural network and one or more deep learning algorithms. In particular, the generative AI model can be configured to identify patterns and structures within existing data to generate new and original content related to the security of system under threat 50. In an embodiment, presentation engine 110 can be operably coupled to the generative AI model, or itself integrate the generative AI model.

A generative AI model can be trained using existing data related to a system under threat, such as sensor data, organizational data, security data, BIA data, and/or enriched integrated bound BIA-security data. In an example, the aforementioned data or subsets of the data can be utilized in a vector for training. Accordingly, the generative AI model can be utilized to detect attacks and anomalies and suggest or implement the best mitigation action considering the importance of business impacts related to the attack and/or mitigation (e.g. impact to various enterprise servers).

Further, a generative AI model can be trained using data related to administrator interfaces. For example, the generative AI model can be trained on existing presentation interfaces and used to present the most efficient interface. In an embodiment, graphical user interfaces and text-based interfaces can be used as training data. In embodiments, presentation engine 110 can therefore present graphical, text-based, or combinations of graphical and text-based interfaces.

In an embodiment, the generative AI model can be trained based on inputs from the administrator to learn to predict the administrator's desired option (e.g. always automatically select the best option with the lowest impact). For example, the generative AI model can be trained on BIA data, the security actions associated with the BIA data, and user feedback to the results of the generative AI model presentation via presentation engine 110. Accordingly, the generative AI model can be further trained using this feedback loop to not only generate and present a description of the incident and remediation impact, but also to enhance the BIA data and the security actions associated with the BIA data, as the generative AI model learns from the administrator feedback (e.g. desirable vs. undesirable remediations, valuable vs. less valuable BIA data, and so on).

In an embodiment, the generative AI model can be trained on the infrastructure of system under threat 50 in order to present a visual representation of the infrastructure and any impacted portions.

In an embodiment, presentation engine 110 can present a visual representation of the infrastructure and overlay a colored heatmap of system under threat 50 in regards to the impact to the organization. For example, the visual representation of the infrastructure with colored heatmap overlay can show in red systems which might be down, and in orange systems that are partially affected, making it easier for an administrator user to understand the extent of the security incident.

In an embodiment, presentation engine 110 can automatically send an alert, for example by email, with a summary of security incidents and evaluation changes, after the predefined time interval has expired. In another example, presentation engine 110 can automatically send an alert by text message or other networked interface to a user.

In an embodiment, the generative AI model can be a large language model (LLM). An LLM can be a machine learning model that processes and generates natural language text. Accordingly natural language text can be used to train the LLM such that it can predict and generate natural language related to a security context of system under threat 50. Accordingly, presentation engine 110 via an LLM can be used to present natural language to the user such that the user can read, in simple terms, the security incident and the impact of any remediation action, in order to provide a straightforward overview.

Presentation engine 110 is further configured to receive user input from user device 116. For example, after presentation of data related to a mitigation action, user selection of the mitigation action can be made via user device 116, and subsequently relayed to security solution engine 102.

In an embodiment, presentation engine 110 can further be utilized to receive system settings from user device 116. System settings can be utilized to configure the components of system 100, such as security solution engine 102, business impact engine 104, enrichment engine 106, re-assessment engine 108, and presentation engine 110.

For example, system settings can include security solution engine 102 and/or re-assessment engine 108 settings such as time value settings, risk level settings, automation settings, and so on. In a particular example, an administrator can pre-set automation levels to his own risk appetite to allow for automated mitigation with accepted risk levels. The administrator may decide to automatically mitigate high urgency incidents (classified as such by security solution engine 102) if the risk to the business with the mitigation action proposed is classified as low. This could for example be the action of terminating the process of an information stealer when it is detected on the main email server.

In another example, system settings can include business impact engine 104 settings such as type of BIA data to collect, duration of BIA data to collect, and so on. In another example, system settings can include enrichment engine 106 settings, such as the type of binding, mapping, weighting, or other enrichment configurations to allow configurability and flexibility in prioritizing BIA data.

In another example, system settings can include presentation engine 110 settings such as the type of data to display (or hide). For example, if an administrator has selected a high level of automation, non-automated tasks can be displayed for ease of viewing. In another example, presentation engine 110 settings can include preferences of a graphical (e.g. dashboard) view or a text-based explanation view (e.g. utilizing a generative AI model to explain the incident and its impact in simple terms)

Figure 2A:
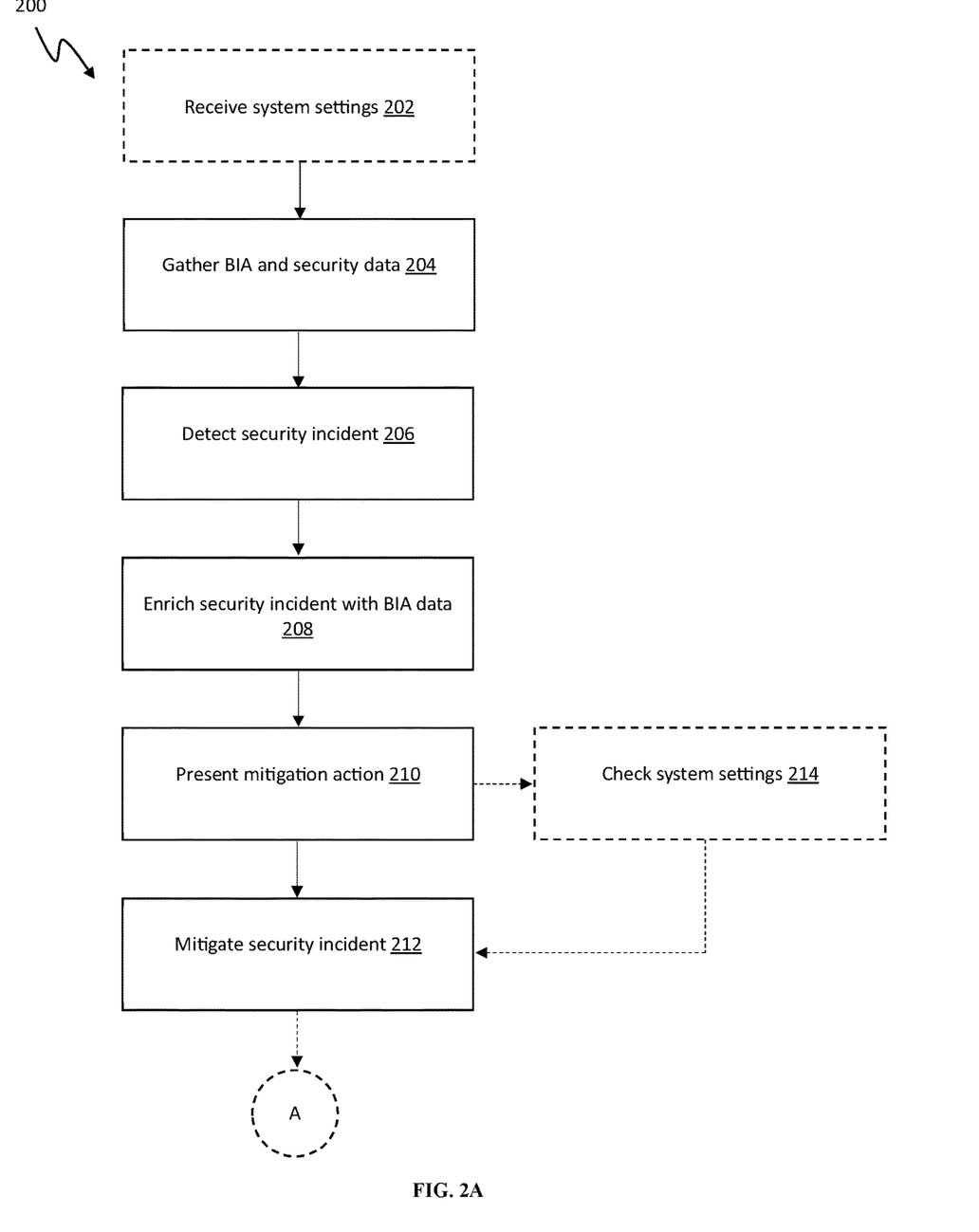
FIGS. 2A-2B are a flowchart of a method for information systems security, according to an embodiment.
Figure 2B:
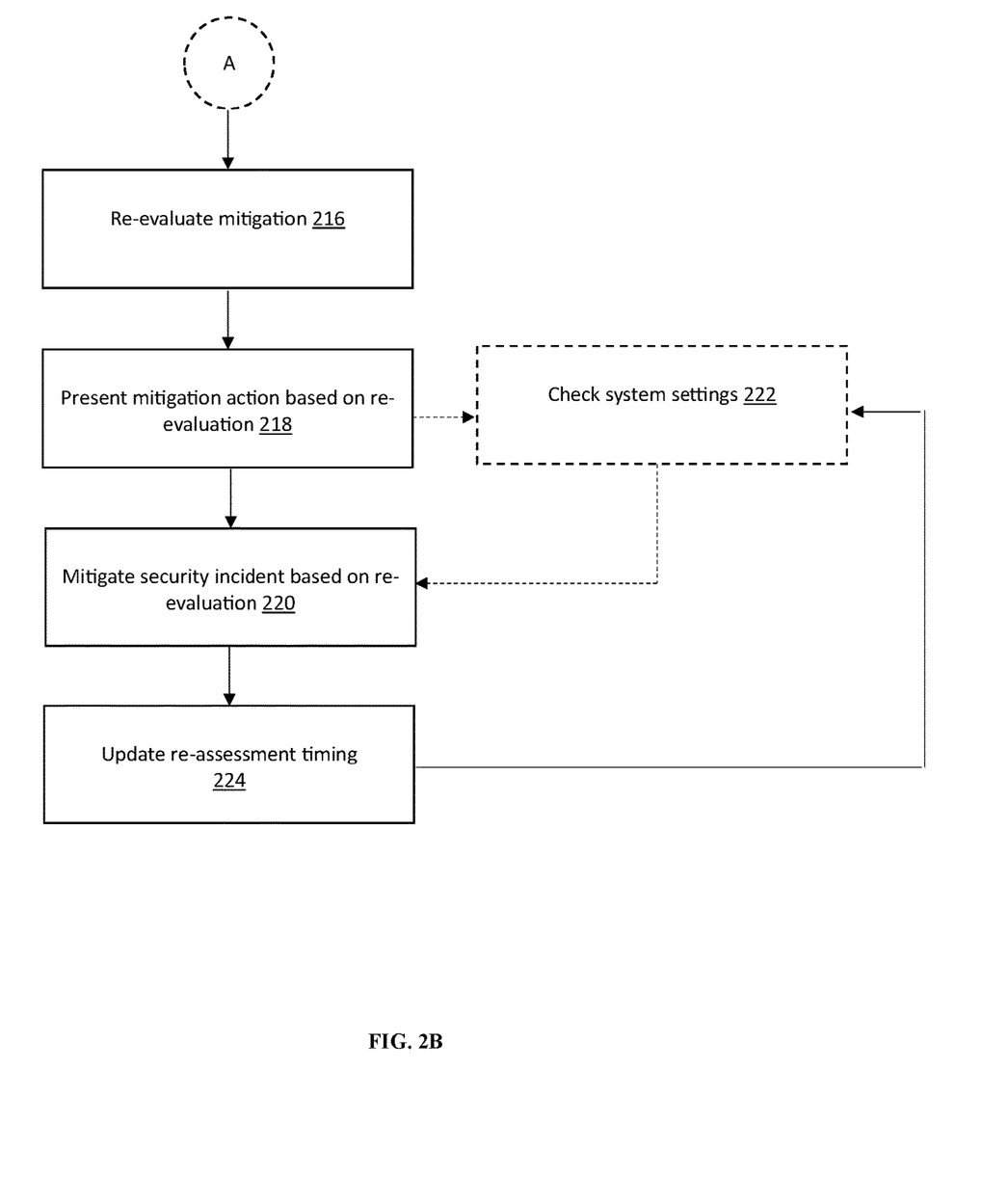

Referring to FIGS. 2A-2B, a flowchart of a method 200 for information systems security is depicted, according to an embodiment. Method 200 can be implemented by system 100, as described above.

At 202, method 200 can optionally receive settings related to execution of method 200 (and system 100). For example, presentation engine 110 can present to a user via user device 116 possible settings for the components of system 100, such as automation and risk level. In an embodiment, an administrator user can input (mitigation risk level t1, severity level s1). In other embodiments, method 200 can proceed with default or pre-programmed settings.

At 204, BIA data and security input data are collected. For example, business impact engine 104 can collect BIA data from or related to system under threat 50. Sensors 112 can collect security input data from or related to system under threat 50. In an embodiment, security solution engine 102 can control collection of data from sensors 112.

At 206, a security incident is detected. For example, security solution engine 102 can detect a security incident using its detection logic based on security input data from sensors 112. In an embodiment, security solution engine 102 can derive a first urgency value without BIA data.

At 208, the security incident is enriched using BIA data. For example, enrichment engine 106 can enrich the security incident using BIA data collected from business impact engine 104. For example, an enriched data structure can incorporate security data with BIA data. In an embodiment, security solution engine 102 can derive a second urgency value in view of the enriched BIA data. More particularly, BIA data can be mapped to one or more affected entities. In an embodiment, a severity of the detected threat and a type of the detected threat can be utilized in coordination with BIA data. For example, if the security incident impacts a critical asset as defined by the enriched data, the second urgency level can be higher compared to the first urgency level.

At 210, a mitigation action is presented. For example, presentation engine 110 can present, via user device 116, a mitigation action to mitigate the security incident. In an embodiment, one or more risk levels of implementing the mitigation action can also be presented. In an embodiment, the user can select to implement the mitigation action, or to not implement the mitigation action.

At 212, the mitigation action is implemented. For example, security solution engine 102 can execute incident response actions including isolating potentially compromised endpoints within the network, terminating suspicious processes, adding processes to block lists, and rolling back various files.

Optionally, from 210, at 214, system settings can be checked by security solution engine 102 in view of the security incident and mitigation action. For example, if certain automated thresholds are satisfied as defined by system settings, the mitigation action can be automatically applied. In an example, if the mitigation risk is lower than (t1) and the incident severity is greater than (s1), as received at 202, the mitigation action can be automatically implemented at 212.

At 216, the success of the mitigation action can be re-evaluated. For example, re-assessment engine 108 can evaluate if the mitigation action implemented at 212 has fully remediated the security incident, or if additional remediation actions are required. In an embodiment, timing of the re-evaluation can be determined by a timer of re-assessment engine 108.

If the mitigation action implemented at 212 has fully remediated the security incident, method 200 can end. However, if the mitigation action implemented at 212 has not fully remediated the security incident, a further mitigation action can be determined. In an embodiment, the further mitigation action can be the same or similar to the original mitigation action (e.g. the mitigation would be successful but failed to execute). In an embodiment, the further mitigation action can be different from the original mitigation action (e.g. the original mitigation was not successful after execution).

At 218, the further mitigation action can be presented based on the re-evaluation at 216. Similar to 210, presentation engine 110 can present, via user device 116, the further mitigation action to further mitigate the security incident. In an embodiment, the user can select to implement the mitigation action, or to not implement the mitigation action.

At 220, the security incident can be further mitigated based on the further mitigation action. Similar to 212, security solution engine 102 can execute incident response actions according to the further mitigation action.

Optionally, from 218, at 222, system settings can be checked by security solution engine 102 in view of the security incident and mitigation action. Similar to 214, if certain automated thresholds are satisfied as defined by system settings, the further mitigation action can be automatically applied.

At 224, reassessment timing can be updated. For example, re-assessment engine 108 can be executed according to a delay counter against a time delay interval, or a threshold against which the delay counter is measured as a wait time for re-assessment execution. The delay counter can be incremented and compared against the time delay interval. In embodiments, the delay counter can be returned to 0 after execution of re-assessment engine 108 for subsequent incrementing again against the time delay interval. From 224, method 200 can proceed again to 222, where system settings can be checked by security solution engine 102 in view of the updated timing. As described herein, the time delay interval can be dynamically adjusted by a machine learning model.

In an embodiment, the time delay interval can be adjusted based on a machine learning model. For example, a timing model can be trained based on previous security incidents and associated wait times. In one example, a feature vector of training data can include a high urgency security incident and a low wait time and the resulting mitigation resolution (e.g. positive resolution) compared to, for example, a high urgency security incident and a high wait time (e.g. negative resolution) and the resulting mitigation resolution. Accordingly, the timing model can learn desirable wait times. Embodiments of system 100 can therefore incorporate dynamically-adjusted wait times as generated by a timing model.

Figure 3:
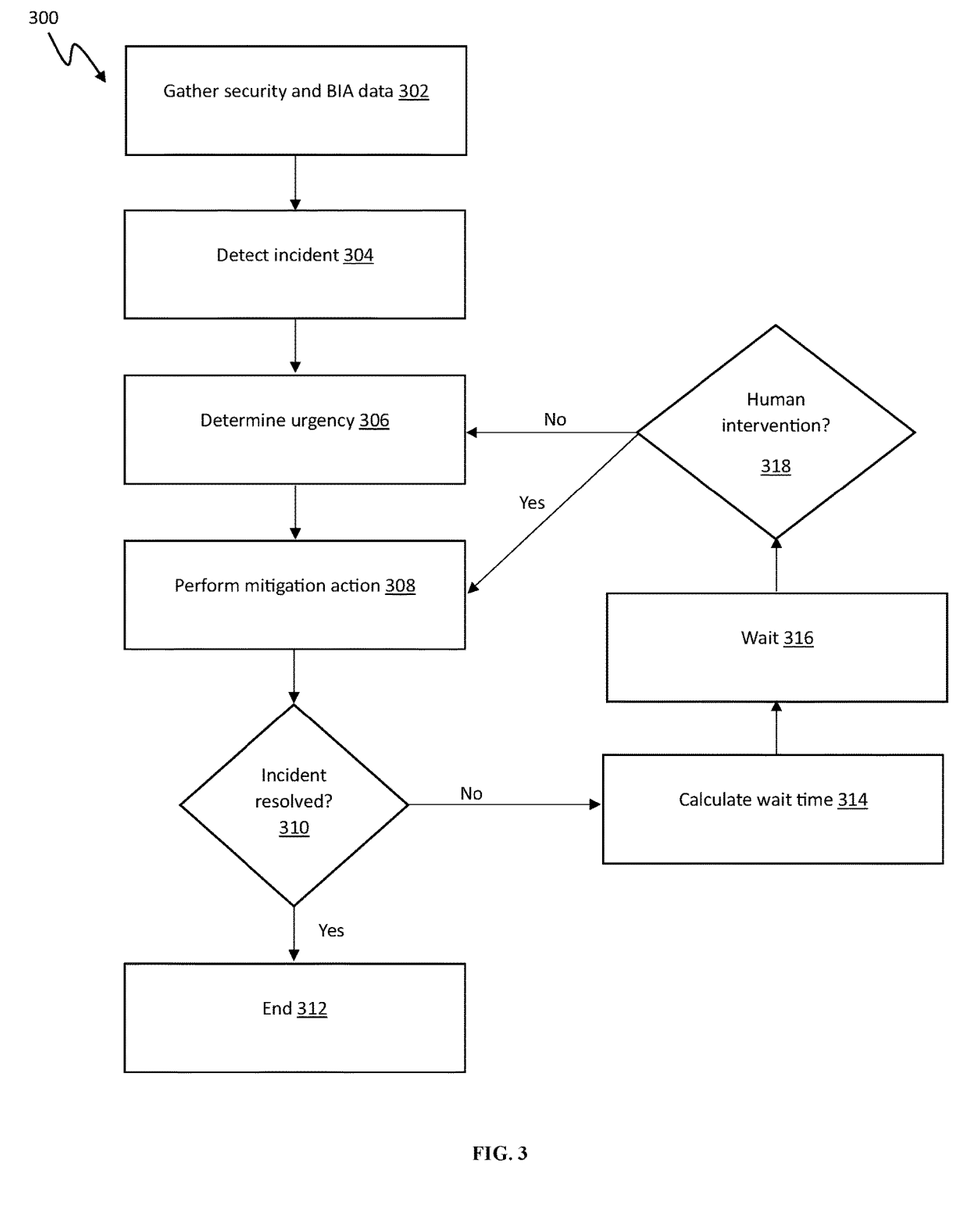
FIG. 3 is a flowchart of a method for information systems security, according to an embodiment.

Referring to FIG. 3, a flowchart of a method 300 for information systems security is depicted, according to an embodiment. Method 300 can be implemented by system 100, as described above.

At 302, data can be gathered related to execution of method 300 (and system 100). For example, business impact engine 104 can gather BIA data from system under threat 50. Security solution engine 102 can gather security data from system under threat 50 (e.g. using sensors 112). In an embodiment, security data can include a malware severity as determined by detection logic analysis by security solution engine 102 of security input data. Configuration data can be gathered by presentation engine 110. In an embodiment, data can further include a mitigation map including action levels and corresponding actions.

At 304, a security incident is detected. In an embodiment, security solution engine 102 can detect an incident based on detection logic and security input data gathered from system under threat 50. In another embodiment, security solution engine 102 can detect an incident based on detection logic and all of the data gathered at 302 (e.g. BIA data, malware severity, configuration data, mitigation map). In other words, a security incident can be detected by detection logic without enriched data and subsequently updated with enriched data, or a security incident can be originally detected by detection logic using enriched data.

At 306, an urgency value is calculated. In an embodiment, security solution engine 102 can determine urgency based on enriched data. Urgency calculations are further described below with respect to FIG. 4.

At 308, a mitigation action is performed based on the urgency value of the security incident. For example, security solution engine 102 can execute incident response actions including isolating potentially compromised endpoints within the network, terminating suspicious processes, adding processes to block lists, and rolling back various files.

At 310, method 300 checks if the security incident is resolved. For example, re-assessment engine 108 can evaluate if the mitigation action performed at 308 has fully remediated the security incident, or if additional remediation actions are required. From 310 at 312, if the mitigation action performed at 308 has fully resolved the security incident, method 300 ends.

However, from 310 at 314, if the mitigation action performed at 308 has not fully resolved the security incident, method 300 proceeds to calculate a wait time. For example, re-assessment engine 108 can be executed according to a delay counter against a time delay interval as a wait time for re-assessment execution. Accordingly, at 316, method 300 waits as defined by the wait time.

At 318, after satisfying the wait time, method 300 checks for human intervention. For example, an administrator user can be presented, via presentation engine 110 and user device 116, a further remediation action. The administrator user can select to implement the further remediation action, thereby satisfying the human intervention check.

From 318, if system 100 has human intervention, such as selection of a further remediation action, method 300 can proceed to perform the further remediation action at 308, as already described.

From 318, if system 100 does not have human intervention, method 300 can proceed to determine an updated urgency value at 306. The urgency value may be changed due to the various data used in the urgency calculation. For example, a change in malware, a longer time since incident, a change to business impact data, etc. can affect the updated urgency value. Accordingly, method 300 can proceed to 308 as already described.

Figure 4:
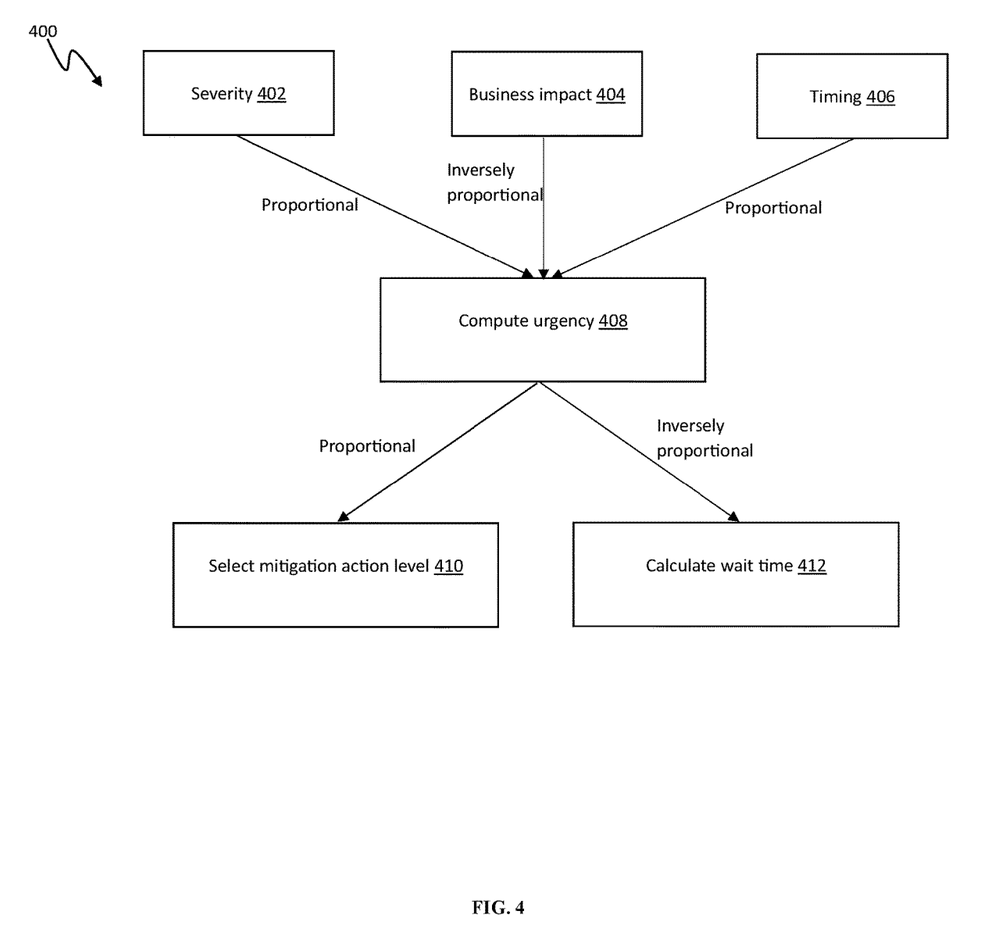
FIG. 4 is a flowchart of a method for information systems security, according to an embodiment.

Referring to FIG. 4, a flowchart of a method 400 for information systems security, according to an embodiment. Method 400 can be implemented by system 100, as described above.

Inputs to method 400 can include data severity 402 (e.g. based on the malware type detected), business impact 404 (e.g. a measurement of if data is lost on a given resource or if the resource is not reachable), and timing 406 (e.g. time since the start of the security incident). For example, security solution engine 102 can determine severity 402 and timing 406. Business impact engine 104 can determine business impact 404.

At 408, an urgency value is calculated. In an embodiment, security solution engine 102 can determine urgency based on the enriched data. In an embodiment, severity 402 is proportional to the urgency calculation. In other words, as severity increases, the associated urgency increases. As severity decreases, the associated urgency decreases. Business impact 404 is inversely proportional to the urgency calculation. In other words, as business impact increases, the associated urgency decreases. As business impact decreases, the associated urgency increases. Timing 406 is proportional to the urgency calculation. In other words, as the time from the start of the security incident increases, the associated urgency increases. Accordingly, urgency values can be calculated according to the security data enriched with BIA data, as well as timing data.

At 410, a mitigation action level is selected. In an embodiment, the urgency value at 408 is proportional to the mitigation action level. In other words, as the urgency value increases, the mitigation action level increases. As the urgency value decreases, the mitigation action level decreases.

A mitigation action level can include a mitigation map. As mentioned above, a mitigation map can include action levels (e.g. based on the calculated urgency) and corresponding actions. In an example, a mitigation map can include a low action level of isolation of the resource. In another example, a mitigation map can include an average action level of terminating a process. In another example, a mitigation map can include a high action level of applying backup to roll back the resource to an earlier version.

At 412, a wait time for assessment or re-assessment is calculated. In an embodiment, the urgency value at 408 is inversely proportional to the mitigation action level. In other words, as the urgency value increases, the wait time level decreases. As the urgency value decreases, the wait time level increases. In an example, a low wait time can include 1 hour or more. In another example, a high wait time can include 24 hours or more.

The invention claimed is:

1. A method for protecting a system under threat using computing hardware of at least one processor and memory operably coupled to the at least one processor, the method comprising:
   under processor control using instructions executed on the at least one processor:
      gathering business impact analysis (BIA) data related to the system under threat;
      gathering, using one or more sensors operably coupled to the system under threat, security input data for the system under threat;
      detecting a security incident based on the security input data;
      determining an original level of urgency of the security incident based on the security input data;
      enriching the security incident with BIA data to generate an enriched data structure, the enriched data structure including:
         BIA data bound to a plurality of mitigation actions to prioritize the mitigation actions according to a business impact reflected in the BIA data, and
         BIA data bound to at least one device of the system under threat affected by the security incident to prioritize the at least one device according to a business impact of the at least one device in the system reflected in the BIA data;
      changing the original level of urgency to an updated level of urgency of the security incident based on the prioritized mitigation actions and the prioritized at least one device;
      presenting, using a graphical user interface, at least one of the plurality of mitigation actions to mitigate the security incident and a risk of implementing the at least one of the plurality of mitigation actions based on the enriched data structure;
      mitigating the security incident by applying the at least one of the plurality of mitigation actions to the system according to the updated level of urgency;
      re-evaluating if the security incident has been fully mitigated using the enriched data structure by determining whether the security incident is resolved according to both a business impact context derived from the BIA data and a security context; and
      when the security incident has not been fully mitigated based on the re-evaluating, applying at least one of the plurality of mitigation actions to the system.

2. The method of claim 1, wherein enriching the security incident with BIA data includes determining overlapping data using at least one of: a server identifier, a system identifier, a process name, an application name, a file name, a network equipment identifier, and a network connection identifier.

3. The method of claim 1, wherein the updated level of urgency is determined according to:
   proportional to a severity value of the security incident;
   inversely proportional to a business impact value; and
   proportional to an elapsed time value of the security incident.

4. The method of claim 1, wherein the at least one of the plurality of mitigation actions to mitigate the security incident is different for the changed level of urgency than the original level of urgency.

5. The method of claim 4, wherein the time delay interval is dynamically adjusted using a machine learning model.

6. The method of claim 1, wherein presenting the at least one of the plurality of mitigation actions further comprises using a generative AI model to describe the security incident and the impact of the at least one of the plurality of mitigation actions using the graphical user interface.

7. The method of claim 1, wherein re-evaluating if the security incident has been fully remediated includes comparing a delay counter against a time delay interval.

8. The method of claim 1, further comprising:
   receiving configuration settings including a risk level tolerance for a mitigation action and a risk level tolerance for a severity level of the security incident, wherein the at least one of the plurality of mitigation actions is presented based on the configuration settings.

9. The method of claim 1, wherein the business impact comprises a plurality of granularities of importance.

10. The method of claim 1, wherein prioritizing the at least one device according to a business impact of the at least one device in the system reflected in the BIA data comprises ranking an importance of the at least one device among a plurality of devices in the system.

11. A system for protecting a system under threat, the system comprising:
    computing hardware of at least one processor and memory operably coupled to the at least one processor; and
    instructions that, when executed on the computing hardware, cause the computing hardware to implement:
       a business impact engine configured to gather business impact analysis (BIA) data related to the system under threat,
       a security solution engine configured to:
          detect a security incident based on security input data for the system under threat, the security input data including data from one or more sensors operably coupled to the system under threat,
          determine an original level of urgency of the security incident based on the security input data, and
          mitigate the security incident by applying at least one of the plurality of mitigation actions to the system under threat according to an updated level of urgency,
       an enrichment engine configured to enrich the security incident with BIA data to generate an enriched data structure, the enriched data structure including:
          BIA data bound to a plurality of mitigation actions to prioritize the mitigation actions according to a business impact reflected in the BIA data, and
          BIA data bound to at least one device of the system under threat affected by the security incident to prioritize the at least one device according to a business impact of the at least one device in the system reflected in the BIA data,
wherein the security solution engine is further configured to change the original level of urgency to the updated level of urgency of the security incident based on the prioritized mitigation actions and the prioritized at least one device;
a presentation engine configured to present, using a graphical user interface, at least one of the plurality of mitigation actions to mitigate the security incident and a risk of implementing the at least one of the plurality of mitigation actions based on the enriched data structure,
a re-assessment engine configured to re-evaluate if the security incident has been fully mitigated using the enriched data structure by determining whether the security incident is resolved according to both a business impact context derived from the BIA data and a security context, and
when the security incident has not been fully mitigated based on the re-evaluating, instructing that the security solution engine apply at least one of the plurality of mitigation actions to the system.

12. The system of claim 11, wherein the enrichment engine is configured to enrich the security incident with BIA data including by determining overlapping data using at least one of: a server identifier, a system identifier, a process name, an application name, a file name, a network equipment identifier, and a network connection identifier.

13. The system of claim 11, wherein the updated level of urgency is determined according to:
proportional to a severity value of the security incident;
inversely proportional to a business impact value; and
proportional to an elapsed time value of the security incident.

14. The system of claim 11, wherein the at least one of the plurality of mitigation actions to mitigate the security incident is different for the changed level of urgency than the original level of urgency.

15. The system of claim 11, wherein the presentation engine is further configured to present the at least one of the plurality of mitigation actions using a generative AI model to describe the security incident and the impact of the at least one of the plurality of mitigation actions using the graphical user interface.

16. The system of claim 11, wherein the re-assessment engine is further configured to re-evaluate if the security incident has been fully mitigated including by comparing a delay counter against a time delay interval.

17. The system of claim 16, wherein the re-assessment engine is further configured to implement a machine learning model and the time delay interval is dynamically adjusted using the machine learning model.

18. The system of claim 11, wherein the presentation engine is further configured to receive configuration settings including a risk level tolerance for a mitigation action and a risk level tolerance for a severity level of the security incident, wherein the at least one of the plurality of mitigation actions is presented based on the configuration settings.

19. A method for protecting a system under threat using computing hardware of at least one processor and memory operably coupled to the at least one processor, the method comprising:
under processor control using instructions executed on the at least one processor:
gathering business impact analysis (BIA) data related to the system under threat;
gathering, using one or more sensors operably coupled to the system under threat, security input data for the system under threat;
detecting a security incident based on the security input data enriched with the BIA data;
determining a first urgency related to the security incident using the security input data;
performing a first mitigation action on the system under threat for the security incident;
determining whether the security incident is resolved;
when the security incident is not resolved, calculating a wait time;
waiting according to the wait time;
determining human intervention for the system under threat associated with the security incident;
when human intervention is not determined, determining a second urgency related to the security incident using an enriched data structure including BIA data bound to a plurality of mitigation actions to prioritize the mitigation actions according to a business impact reflected in the BIA data, and BIA data bound to at least one device of the system under threat affected by the security incident to prioritize the at least one device according to a business impact of the at least one device in the system reflected in the BIA data; and
when human intervention is determined, performing a second mitigation action on the system under threat for the security incident.

20. The method of claim 19, further comprising:
determining whether the security incident is resolved according to a second determination;
when the security incident is not resolved according to the second determination, calculating a second wait time; and
waiting according to the second wait time.

* * * * *